United States Patent
Steinhauser et al.

(10) Patent No.: US 8,423,230 B2
(45) Date of Patent: Apr. 16, 2013

(54) METHOD AND DEVICE FOR CONTROLLING A PARALLEL HYBRID DRIVE-TRAIN OF A VEHICLE

(75) Inventors: Klaus Steinhauser, Kressbronn (DE); Michael Sohler, Isny (DE); Falko Platzer, Friedrichshafen (DE); Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 336 days.

(21) Appl. No.: 12/783,640

(22) Filed: May 20, 2010

(65) Prior Publication Data

US 2010/0312423 A1 Dec. 9, 2010

(30) Foreign Application Priority Data

Jun. 4, 2009 (DE) .................. 10 2009 026 702

(51) Int. Cl.
 *G06F 17/00* (2006.01)
(52) U.S. Cl.
 USPC ............. 701/29.2; 701/22; 701/32.8; 701/67; 180/65.25; 180/65.275
(58) Field of Classification Search ............ 180/65.265, 180/65.25, 65.275; 701/22, 29.2, 62, 67, 701/32.8; 903/930, 945, 946
 See application file for complete search history.

(56) References Cited

U.S. PATENT DOCUMENTS

| | | | |
|---|---|---|---|
| 4,843,551 A * | 6/1989 | Milunas .......................... 701/55 |
| 5,721,682 A * | 2/1998 | Arai et al. ....................... 701/67 |
| 6,054,776 A | 4/2000 | Sumi | |
| 6,380,641 B2 * | 4/2002 | Matsubara et al. ......... 290/40 C |
| 6,517,464 B2 * | 2/2003 | Yamazaki et al. ................. 477/5 |
| 6,616,569 B2 * | 9/2003 | Hoang et al. ....................... 477/3 |
| 6,625,534 B2 * | 9/2003 | Suzuki et al. ................... 701/62 |
| 7,643,924 B2 * | 1/2010 | Kawamura et al. ............ 701/62 |
| 7,708,095 B2 * | 5/2010 | Hirata ...................... 180/65.275 |
| 7,784,575 B2 * | 8/2010 | Yamanaka et al. ....... 180/65.275 |
| 8,010,264 B2 * | 8/2011 | Ogata et al. ..................... 701/55 |
| 2007/0207892 A1 | 9/2007 | Dreibholz et al. | |
| 2008/0011529 A1 | 1/2008 | Hoher et al. | |
| 2008/0017427 A1 * | 1/2008 | Nakanowatari .............. 180/65.2 |
| 2009/0181821 A1 * | 7/2009 | Henneken et al. ................. 477/5 |
| 2009/0265068 A1 * | 10/2009 | Kamioka et al. ................ 701/67 |

(Continued)

FOREIGN PATENT DOCUMENTS

| | | |
|---|---|---|
| DE | 198 18 108 A1 | 11/1998 |
| DE | 10 2006 005 468 A1 | 8/2007 |
| DE | 10 2006 033 087 A1 | 1/2008 |

*Primary Examiner* — Ruth Ilan
*Assistant Examiner* — James English
(74) *Attorney, Agent, or Firm* — Davis & Bujold, PLLC

(57) ABSTRACT

An method for controlling a parallel hybrid drive-train of a vehicle comprising an automatic transmission and a combustion engine which is connected, via a first shifting device, to an electrical machine, which is connected, via a drive shaft, a starting clutch positioned in the transmission. To guarantee safety and high drive comfort of the vehicle during failure of the starting clutch, shifting failures of the starting clutch are monitored. If a shifting failure is recognized, predetermined contingency procedures are initiated and executed in which either continued drive of the vehicle or slowing down of the vehicle to a stop is possible. A device comprises a monitor with a sensor and parts for analyzing and recognizing shifting failures of the starting clutch. Control parts initiate and execute contingency procedures such that a continued drive operation or slowing down of the vehicle to a stop is possible.

14 Claims, 1 Drawing Sheet

U.S. PATENT DOCUMENTS

2009/0318261 A1* 12/2009 Tabata et al. ............... 477/3
2010/0075798 A1* 3/2010 Suzuki et al. ............... 477/5
2011/0053734 A1* 3/2011 Kaltenbach et al. ............... 477/5
2012/0109438 A1* 5/2012 Akebono et al. ............... 701/22

* cited by examiner

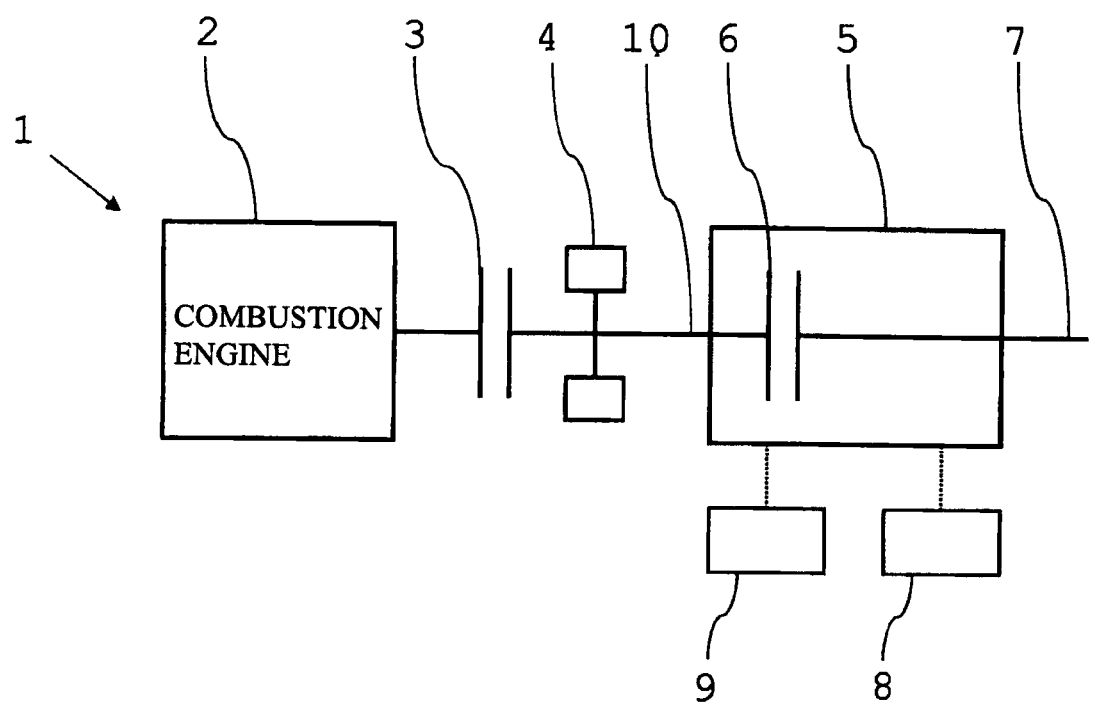

METHOD AND DEVICE FOR CONTROLLING A PARALLEL HYBRID DRIVE-TRAIN OF A VEHICLE

This application claims priority from German patent application serial no. 10 2009 026 702.6 filed Jun. 4, 2009.

FIELD OF THE INVENTION

The invention relates to a method and a device for controlling a parallel hybrid drive train of a vehicle.

BACKGROUND OF THE INVENTION

Known through DE 10 2006 033 087 A1 is a vehicle which has a drive train where a first clutch device is positioned between a combustion engine and a motor driven, a generator driven, electrical machine, and, in an 8-gear automatic transmission with four, partially coupled planetary gear sets, a second clutch device is positioned. During a start procedure via the electrical machine, the first clutch will be engaged and the second clutch, integrated into the transmission, will be activated to perform a temporary slippage operation. Thus, through this integrated starting clutch, the flow of force branches into several gears. A comparable parallel hybrid drive train with a slippage controlled, integrated starting clutch is also shown in DE 10 2006 005 438 A1.

The DE 198 18 108 A1 presents a different hybrid drive train, in which a combustion engine, an electrical machine, and a vehicle transmission are configured in a controllable drive relationship via a planetary transmission. On the input side, the combustion engine is connected with a planetary gear via a first shaft, and the electrical machine is connected via a second shaft with a sun gear of the planetary transmission. On the output side, a planetary gear carrier is connected with the vehicle transmission via a third shaft. A controllable clutch is positioned between the combustion engine and the electrical machine and which optionally connects the input shafts of the combustion engine and the electrical machine. To avoid a clutch kick during the start of the vehicle, the electric motor is operated initially, with a running combustion engine, with a disengaged clutch as a generator. Through its brake torque, the combustion engine is kept at a predetermined idle rotation speed via the planetary transmission, so that the rotational speeds of the three drive shafts converge and that, at equal rotation speeds, the clutch can be comfortably engaged, meaning absolutely kick free.

The permanent functional readiness of the shifting device, functioning as a starting clutch, is very important in such hybrid systems, especially in systems were the starting clutch is integrated into the vehicle transmission as a multifunctional part. However, a breakdown of such a controllable shifting device cannot be completely excluded.

If a vehicle is slowing down when driving at speed, with an engaged, integrated starting clutch, such clutch is expected to regularly disengage at a certain engine rotation speed, above or equal to a set idle rotation speed. If the clutch, despite a respective activation, does not disengage, for instance because of a hydraulic valve which is blocked, due to contamination in the hydraulic oil, such malfunction of the clutch can cause the engine rotation speed, during the slowdown of the vehicle, to end up lower than the set idle rotation speed. Hence, to avoid stalling of the engine, a usual idle control would request higher engine torque which will ultimately lead to acceleration of the vehicle. A driver, activating the brake pedal, experiences hereby an initial slowing down of the vehicle, followed by a surprising acceleration.

Such a behavior of a vehicle, which is irritating to the driver, can lead to a reduced drive comfort and can even result in a disabled vehicle.

SUMMARY OF THE INVENTION

In view of this background, the invention has the task to present a method and a device for controlling a parallel hybrid vehicle with a starting clutch residing in the transmission, where the starting clutch guarantees a high safety and possibly a high drive comfort of the vehicle, especially also during a failure of the integrated starting clutch.

The invention is based on the knowledge that, in vehicles with modern automatic transmissions and a relative high number of gears, a disengagement failure of an integrated starting clutch in the drive train can in many cases temporarily be compensated for by shifting of substitute gears, considering an engaged, integrated starting clutch, or that at least a suspension of the traction is possible by bypassing the engaged, integrated starting clutch.

It can be achieved by the recording of recognized failures into a failure memory section of a suitable controlling and monitoring device which can preventively determine through an analysis of failures of the regular transfer of force, clearly related to the failure of the clutch, either event driven or by a direct, cycled functional test of the clutch, timed closely to the event of the failure or even in anticipation of a possible failure.

Hence, the invention is initially based on a method for controlling a parallel hybrid drive train of a vehicle, with an automatic transmission and a combustion engine which can be connected, via a first shifting device which functions as a separation clutch, an electrical machine which is connected via a drive shaft and positioned in the transmission, with a second shifting device, functioning as a starting clutch. To solve the given task, the invention provides that monitoring of the failures to recognize shifting failures of the starting clutch is performed, and that, in case of a recognized failure, predetermined contingency procedures are initiated and executed, through which continuation of the drive operation or slowdown of the vehicle, up to a complete stop, is made possible.

In addition, the invention is based on a device for controlling a parallel hybrid drive train of a vehicle, with an automatic transmission and a combustion engine, which can be connected through a first shifting device, functioning as a separation clutch, with an electrical machine, which is connected with a second shifting device, functioning as a starting clutch, via a drive shaft which is positioned in the transmission. To solve the given task in regard to the device, the invention provides a failure monitoring device which has sensor and analyzing parts for recognizing shifting failures of the starting clutch assigned to it, as well as control parts for initiation and execution of contingency procedures through which a continuation of the drive operation or a slowdown of the vehicle, to a complete stop, is made possible.

Through the failure monitoring, in accordance with the invention, an actual shifting failure takes place, or an anticipated shifting failure of the starting clutch in an upcoming shifting procedure where especially the requested disengagement of the clutch does not take place, can be reliably recognized.

Particularly in the case of a rapid torque request, meaning a rapid increase of the drive torque of the combustion engine and/or the electrical machine, in which, without related activation of the drive pedal and/or without a significant deviation of the rotational speed of the combustion engine from a predetermined set idle rotation value, a torque monitoring threshold for a set minimum time interval is exceeded, for instance 50 milliseconds, it is assumed that a disengagement failure of the integrated starting clutch took place, initiating a recording of the failure into the memory, through which a contingency procedure is initiated.

As a reaction to a recognized disengagement failure of the starting clutch, possible contingency procedures are explored and, if necessary, executed, which do allow a continuation of the drive of the vehicle.

In particular, it can be provided that a transmission ratio monitoring device, often present in modern transmissions and in case a regular shifting procedure fails in which a shifting of the integrated starting clutch is provided, can be used advantageously to avoid gears which have a shifting involvement with the integrated starting clutch and to modify the shifting control accordingly.

In case a disengagement rotational speed value of the clutch falls short when slowing down the vehicle, so that stalling of the engine impends, the immediate, next procedure is the preparation and execution of a forced neutral shifting. During a forced neutral shifting, the traction of force, in the remaining transmission which is independent from the integrated starting clutch, meaning the force branches in the transmission and through bypassing of the particular branch, is abandoned as fast as possible.

Also, as an additional safety precaution for the vehicle, it can be provided that, in case of a safety critical delay or a failure of the forced neutral shifting, stalling of the combustion engine can be allowed by the driver by means of a vehicle brake, whereby the drive torque of the combustion engine and/or the electrical machine will be limited to a maximum value ahead of time, depending on a drive pedal position or a request of the drive for a different value. This procedure enables a quasi moderate stalling of the motor. Hereby and regarding the idle control, the allowable torque will be limited to a maximum value, for instance, to 50 Nm when stationary. In case that the traction cannot be disabled fast enough or cannot be achieved fast enough, the motor of the vehicle will be stalled through the vehicle brake, whereby a possible, safety critical pushing of the vehicle will be avoided.

Beside the event driven failure recognition, preventive failure recognition in regard to the functionality of the integrated starting clutch is possible. It can be provided, for that purpose, that during a drive operation a slippage test is performed and analyzed at the starting clutch in predetermined intervals and for those gears, where the flow of force branches via the integrated starting clutch, and, if necessary, a failure message is issued or the failure is recorded into an electronic memory is performed.

Thus, and during the drive operation, this clutch is brought cyclically by the way of trial into a slippage condition for those gears, dependent on the respective, present vehicle transmission system, where the rotational speed and therefore a slippage determination can be obtained from the starting clutch. Hereby, assuming an engaged condition, the larger traction pressure, which usually exists at the starting clutch under that condition, is reduced by means of a pressure which is higher than the currently present torque load. It is hereby analyzed whether a slippage can be realized, for instance at what traction drive pressure, meaning at which stage of transfer in relationship to the transmission load torque, or the motor torque, respectively. It needs to be mentioned here that the determined value for the start of slippage during the slippage test can also advantageously be used for adoption of the actual friction value of the integrated starting clutch.

If the slippage of the clutch, in reference to the traction pressure, remains inside of a predetermined, plausible test area, it cannot be expected that the pressure modulation, or the suspension of the pressure between friction parts, respectively, which is needed for the disengagement of the integrated starting clutch will fail in an upcoming, relevant shifting or slow down procedure. In case that a disengagement of the integrated starting clutch, against expectation, is nevertheless not possible, at least the described, event driven failure recognition becomes effective.

If, however, the slippage test shows that the integrated starting clutch can most likely not be disengaged during the next, upcoming shifting procedure, a failure recording will already take place during the drive operation into a sufficiently sized electronic data storage and appropriate contingency procedures are prepared. Again, initially all shifting operations which require disengagement of the integrated starting clutch are avoided and, if necessary, a suitable substitution gear is preselected.

During a slowdown and a shortfall of the disengagement rotation speed at the starting clutch the suspension of the traction in the drive train is ensured, not only through the attempt to disengage the starting clutch but, in addition, also through a precautionary request for a forced neutral shift in the remaining transmission.

To further increase the availability of the drive train for continued driving or starting after deceleration into a stop when the starting clutch cannot be disengaged, it can also be provided that, in case of a recognized disengagement failure of the integrated starting clutch, the combustion engine, if required, is decoupled from the drive train through disengagement of the separation clutch and that temporarily a true electrical drive takes place, and that the combustion engine, through engagement of the separation clutch, is again coupled to the remaining drive train when a transmission input rotation speed, suitable for the combustion engine drive, has been reached.

Hence, based on an event driven or by a preventive failure recording in an electronic data storage device, when a shifted gear in which the integrated starting clutch takes part, the separation clutch is disengaged at a predetermined disengagement rotational speed. An electrical, auxiliary pump, positioned in hybrid drive systems can advantageously assume during the time span, in which a mechanically driven hydraulic pump is decoupled from the combustion engine, to supply the lubricant oil, cooling oil and pressure oil. At a disengaged separation clutch and an engaged integrated starting clutch, the vehicle is thereafter slowed down through an electric drive mode.

After a stop, the vehicle can perform an electric start and when a respective transmission input rotational speed is reached, the combustion engine can also be added. Basically, it is even possible to start the combustion engine again, without a slippage operation of the starting clutch (because it is still engaged) in case the prior stalling could not be avoided even though the separation clutch has been disengaged.

For clarification of the invention, the method of the failure section and the execution of contingency operations in a parallel hybrid drive train of a vehicle is herewith further described during a shifting failure of a starting clutch inside of a transmission and as an example of an 8-gear automatic transmission, as it has been previously mentioned through DE 10 2006 033 087 A1 and as it is known to the applicant.

BRIEF DESCRIPTION OF THE DRAWINGS

The drawing shows a simplified schematic of a parallel hybrid drive trail.

DETAILED DESCRIPTION OF THE PREFERRED EMBODIMENTS

The single drawing shows a very simplified schematic view of a parallel hybrid drive train. The parallel hybrid drive train system 1 has as essential parts, in the direction of the flow of force, a combustion engine 2, a separation clutch 3, an electrical machine 4 which can be operated as a motor or generator, an 8-gear automatic transmission 5 with a transmission ratio monitor 8, integrated in the automatic transmission 5 is a starting clutch 6, which can be controlled by a failure monitoring device 9, and an output 7. The failure monitoring device 9 can be designed as a part of another present control device. The integrated starting clutch 6, in this transmission 5, takes part in the torque transfer of gears 1 to 5, as well as for a reverse gear.

In the following, a scenario is assumed in which the vehicle drives with an engaged or nearly engaged integrated starting clutch 6 and is now slowed down by brake pedal activation by the driver. The starting clutch 6 is expected to disengage at a certain motor rotational speed, determined as disengagement rotational speed and is slightly above or equal to a set idling rotation speed 2, so that the combustion engine 2 does not stall. Despite appropriate activation, the starting clutch 6 does not disengage, as for instance, an assigned hydraulic valve, which needs to be switched, is blocked because of contamination in the hydraulic oil. Hence, the torque transfer via the starting clutch 6 cannot be suspended as required.

The motor rotational speed will be reduced below the set idle rotational speed during the following slow down of the vehicle. Via idle control of the combustion engine 2, the drive torque will therefore be increased to avoid stalling of the motor 2, which would cause a sudden acceleration of the vehicle.

The failure monitoring device 9 performs a clutch diagnosis, whereby a disengagement failure in the integrated starting clutch 6 is assumed, because the driver does not activate the drive pedal and the motor rotational speed is, for the time being, in the range of an idle rotational speed, where hereafter the drive torque sharply increases and it will cause exceeding a determined monitoring threshold for a predetermined time interval.

The problem of the clutch could also have been detected through the transmission ratio monitoring device 8, or might have been indicated at the starting clutch 6, through a preventive, cycled slippage test in which the slippage, despite a reduced traction pressure, does not start at all or does not meet the expectation. In each case of a failure of the clutch, a respective failure recording in an electronic memory will be initiated which will generate the preparation of and is followed by execution of a contingency procedure in the drive train.

Once the transmission ratio monitoring device 8 has identified a problem with the starting clutch 6, for instance a non-functioning switch-off of the starting clutch 6 during an upshift attempt into the sixth gear or a higher gear, or a non-functioning switch-on of the starting clutch 6 during a downshift attempt from the sixth gear or a higher gear into a lower gear, a gear is shifted as a contingency procedure where a shifting procedure of the starting clutch 6 is not required. Hence, the starting clutch 6 is not considered anymore as an active clutch.

In case the disengagement rotation speed falls short during the slowdown, or a shortfall of the disengagement rotational speed during the restricted drive operation cannot be avoided, which is due to the inactive starting clutch 6, at this time, a forced neutral shift in the automatic transmission is initiated, where the traction in the remaining transmission is instantly suspended, meaning through bypassing of the starting clutch 6 which blocks the control.

In the case of a preventive failure recognition based on the previously mentioned slippage testing, which determines the necessary disengagement of the starting clutch 6 during an upshift into the sixth gear or a higher gear, or during the slowdown and to a stop, is unsafe, the contingency procedure will already take place during the drive operation. Preferably, upshifts are avoided in which the starting clutch 6 is involved. During a slowdown and a shortfall of the disengagement rotational speed, the respective control will continue to attempt to disengage the clutch. In parallel, the suspension of the traction in the drive train is guaranteed through the additional requests for a forced neutral in the remaining transmission.

If the transmission ratio monitoring device 8 recognizes that a required disengagement of the starting clutch 6 is not possible, an additional embodiment of the method can activate the separation clutch 3, if a required hydraulic supply is guaranteed when the combustion engine 2 is decoupled, for instance through and the electric supply pump.

Thus, the separation clutch 3 gets disengaged at a predetermined disengagement rotational speed, whereby the vehicle, or the vehicle drive, respectively, changes to a true electric drive mode. In that mode, the vehicle is slowed down to a complete stop, whereby basically downshifts from the fifth gear down to the first gear are still possible without shifting participation of the starting clutch 6. If applicable, a following starting procedure takes place in a true electric mode. The combustion engine 2 can keep idling, during the decoupling through the disengagement of the separation clutch 3, and when the respective rotation speed is reached it can be switched into the transmission input 10 after the start. In case the combustion engine 2 stalled previously, its start is possible through an engagement of the separation clutch 3.

REFERENCE CHARACTERS

1 Parallel Hybrid Drive System
2 Combustion Engine
3 Shifting Device, Separating Clutch
4 Electrical Machine
5 Transmission
6 Shifting Device, Starting Clutch
7 Output
8 Transmission Ratio Monitoring Device
9 Failure Monitoring Device
10 Transmission Input

The invention claimed is:

1. A method of controlling a parallel hybrid drive-train of a vehicle comprising an automatic transmission (5), a combustion engine (2) being connectable, via a separation clutch (3), to an electrical machine (4), and the electrical machine (4) being connected, via a drive shaft, to a starting clutch (6) located within the automatic transmission (5), the method comprising the steps of:

monitoring operation of the starting clutch (6) to recognize a failure of the starting clutch (6) to disengage, performing a test of the starting clutch (6), between gear shifts, for determining an ability of the starting clutch (6) to disengage, and upon recognizing the failure of the starting clutch (6) to disengage, initiating and processing a predetermined failure correction so as to one of continue a drive driving operation of the vehicle or commence a slowing down operation of the vehicle to a stop.

2. The method as in claim 1, further comprising the step of, when the starting clutch (6) fails to disengage as requested, recognizing one of an actual disengagement failure occurring or an execution failure of an upcoming shifting as a possible disengagement failure of the starting clutch (6) by monitoring failures.

3. The method as in claim 1, further comprising the step of assuming a disengagement failure is occurring when a request is made for a rapid increase of driving torque of at least one of the combustion engine (2) and the electrical machine (4), where a monitored torque threshold will be exceeded for a defined minimum period, without any related drive pedal activation and without any significant deviation of the rotational speed of the combustion engine (2) from a predetermined nominal value.

4. The method as in claim 1, further comprising the step of, during a drive operation for at least one gear position in which a flow of force passes through the starting clutch (6), performing repeated slippage tests,
analyzing the slippage tests during predetermined intervals for failure of the starting clutch (6) to disengage, and
issuing any detected failure message.

5. The method as in claim 1, further comprising the step of, if a failure of a regular shifting procedure in which shifting of the starting clutch (6) is intended, issuing a failure message through a transmission ratio monitoring device (8).

6. The method as in claim 1, further comprising the step of, upon recognition of a disengagement failure of the starting clutch (6), initiating a substitution procedure in a form of an enforced neutral shift of the transmission (5), within the drive-train, via an alternative branch of force.

7. The method as in claim 1, further comprising the step of, if there is a safety critical delay or a failure of an enforced neutral shift, enabling a driver to stall the combustion engine (2) whereby torque of at least one of the combustion engine (2) and the electrical machine (4) is limited to a maximum value which is dependent upon one of a drive pedal position and another parameter based on a request of the driver.

8. The method as in claim 1, further comprising the step of, upon recognizing an upcoming failure of the starting clutch (6) to disengage, issuing a failure message and initiating a preventive contingency procedure.

9. The method as in claim 8, further comprising the step of bypassing a shifting procedure in which the starting clutch (6) is shifted due to the preventive contingency procedure.

10. The method as in claim 1, further comprising the step of, if a predetermined clutch disengagement rotation speed value falls short, preparing an enforced neutral shift of the transmission, as a preventive contingency procedure, and, at about the same time, activating the starting clutch (6) in a disengagement direction.

11. The method as in claim 1, further comprising the step of, if the predetermined clutch disengagement rotational speed falls short, initiating an enforced neutral shift and pre-selecting a shiftable substitution gear, via a transmission ratio control device (8), as a preventive contingency procedure.

12. The method as in claim 1, further comprising the step of, upon recognition of a failure of the starting clutch (6) to disengage, disconnecting the combustion engine (2) from the drive-train by disengaging the separation clutch (3),
temporarily driving the drive-train electrically, and,
when a transmission input rotation speed reaches a speed which is suitable for drive by the combustion engine, engaging the separation clutch (3) to connect the combustion engine (2) to the drive-train.

13. A device for controlling a parallel hybrid drive-train of a vehicle having an automatic transmission (5), a combustion engine (2) being connectable, via a separation clutch (3), to an electrical machine (4), and the electrical machine (4) being connected, via a drive shaft, with a starting clutch (6) positioned inside of the transmission (5), the device comprising:
a starting clutch disengagement failure monitoring device (9) comprising sensor parts and analyzing parts assigned for recognition of a failure of the starting clutch (6) to disengage,
performing a test of the starting clutch (6) between shiftings to confirm that the starting clutch is disengaging, and
the failure monitoring device (9) being coupled to parts for initiating and executing substitution procedures, upon determining the failure of the starting clutch (6) to disengage, by which one of a continued drive operation of the vehicle and slowing down of the vehicle to a stop can occur.

14. A method of controlling a parallel hybrid drive-train of a vehicle comprising an automatic transmission, a combustion engine being connectable, via a separation clutch, to an electrical machine, and the electrical machine being connected, via a drive shaft, to a starting clutch located within the automatic transmission, the method comprising the steps of:
monitoring failure operation of the starting clutch so as to recognize a failure of the starting clutch to disengage and thereby interrupt a flow of torque from the engine to the transmission,
cyclically performing a slippage test of the starting clutch, between gear shifts, to determine an ability of the starting clutch to achieve a slippage condition, and
upon recognizing a failure of the starting clutch (6) to achieve the slippage condition, initiating and processing a predetermined failure correction so as to one of continue a driving operation of the vehicle or commence a slowing down operation of the vehicle to a stop.

* * * * *